United States Patent
Budinger et al.

(10) Patent No.: US 7,837,364 B2
(45) Date of Patent: Nov. 23, 2010

(54) READING LIGHT HAVING DIFFUSED LIGHT SUPPRESSION

(75) Inventors: Tilo Budinger, Hamburg (DE); Carsten Vogel, Hamburg (DE)

(73) Assignee: Airbus Deutschland GmbH (DE)

( * ) Notice: Subject to any disclaimer, the term of this patent is extended or adjusted under 35 U.S.C. 154(b) by 268 days.

(21) Appl. No.: 12/082,690

(22) Filed: Apr. 11, 2008

(65) Prior Publication Data
US 2009/0010014 A1  Jan. 8, 2009

Related U.S. Application Data

(60) Provisional application No. 60/923,114, filed on Apr. 12, 2007.

(30) Foreign Application Priority Data
Apr. 12, 2007 (DE) ........................ 10 2007 017 343

(51) Int. Cl.
*B64D 47/02* (2006.01)
(52) U.S. Cl. ........................ 362/471; 362/470; 362/554; 362/555
(58) Field of Classification Search ................ 362/470, 362/471, 488, 554, 555, 556, 217.03, 217.04, 362/290, 342
See application file for complete search history.

(56) References Cited

U.S. PATENT DOCUMENTS 3,239,515 A    3/1966  Heyningen et al.
5,570,239 A *  10/1996 Raimondi .................. 359/873
5,921,662 A *   7/1999 Bruckner et al. ........... 362/292
6,220,729 B1 *  4/2001 Holten ....................... 362/291
6,520,666 B1    2/2003 Beyerlein et al.
6,796,690 B2 *  9/2004 Bohlander .................. 362/471
6,932,497 B1 *  8/2005 Huang ....................... 362/494
6,997,583 B2 *  2/2006 Broelemann ................ 362/471
7,465,080 B2 * 12/2008 Van Gennip et al. ........ 362/511
2005/0157512 A1  7/2005 Suzuki et al.

FOREIGN PATENT DOCUMENTS

DE    16 70 597   10/1970
DE    199 08 040   8/2000
DE    101 09 997   9/2002

OTHER PUBLICATIONS http://solutions.3m.com/wps/portal/3M/en_US/ComputerFilter/Home/, Jun. 25, 2008.
http://en.wikipedia.org/wiki/Optical_fiber, Jun. 25, 2008.

* cited by examiner

*Primary Examiner*—Stephen F Husar
*Assistant Examiner*—James W Cranson
(74) *Attorney, Agent, or Firm*—Lerner, David, Littenberg, Krumholz & Mentlik, LLP (57) ABSTRACT

An individual cabin illumination device in an aircraft, the device having a light source associated with a passenger or with a group of passengers and an antidazzle device, wherein the antidazzle device includes a multitude of light-directing units which may be arranged one beside the other. Each light-directing unit includes a light-inlet aperture, a light-outlet aperture and a wall that connects the light-inlet aperture to the light-outlet aperture, wherein the light-directing units allow diffusion of the light that can be given off by the light source essentially only onto the passengers associated with the light source.

14 Claims, 5 Drawing Sheets

READING LIGHT HAVING DIFFUSED LIGHT SUPPRESSION

CROSS-REFERENCE TO RELATED APPLICATIONS

This application claims the benefit of the filing date of U.S. Provisional Patent Application No. 60/923,114 filed Apr. 12, 2007, the disclosure of which is hereby incorporated herein by reference.

BACKGROUND OF THE INVENTION

The present invention relates to individual cabin illumination in aircraft, and in particular to an individual cabin illumination device in aircraft, comprising a light source, which is associated with a passenger or with a group of passengers, and an antidazzle device.

Individual illumination, in particular for example in the form of a reading light, is used as a light source in vehicles, and in particular in aircraft, in order to illuminate the so-called reading plane of a seated passenger. Illumination by way of individual illumination or reading illumination is to make it possible for a passenger to carry out various tasks that require a good level of light, without illuminating the surroundings of the seat, for example the adjacent seat or the seat of the person operating the vehicle. To this effect, individual lights or reading lights have been used that represent a combination of a light source with a lens or a diffuser screen. The light of the light source, which light is concentrated to a greater or lesser extent, impinges on the lens or on the diffuser screen where it is deflected into the desired direction so that a light cone arises which illuminates the required reading plane as homogeneously as possible at a defined brightness level. By means of the lens or the diffuser screen a certain part of the light is directed by the light source onto the reading plane. However, a considerable part of the light is diffused in the space, and is thus able to dazzle persons who are present in the region of the diffused light. In particular an effect arises in which the lens or the diffuser screen is perceived to be brightly lit when observed from other points, for example from the adjacent seat or the seat located behind. For example in a darkened cabin or during travel at night in a motor vehicle this results in undesirable dazzling that can result in inconvenience to the people seated in adjacent seats.

SUMMARY OF THE INVENTION

According to an exemplary embodiment of the invention, an individual cabin illumination device in an aircraft, comprising a light source associated with a passenger or with a group of passengers, and an antidazzle device is provided, wherein the antidazzle device comprises a multitude of light-directing units, one arranged beside the other wherein each light-directing unit comprises a light-inlet aperture and a light-outlet aperture and a wall that connects the light-inlet aperture to the light-outlet aperture, wherein the light-directing units allow diffusion of the light that can be given off by the light source essentially only onto the passengers associated with the light source.

According to an exemplary embodiment of the invention, the multitude of light-directing units are arranged one beside the other in a matrix, wherein the matrix provides the antidazzle device with a flat shape.

In this way an antidazzle device is provided, which is light in weight as a result of its flat shape, which antidazzle device in an individual cabin illumination device makes it possible to illuminate a region which, for example, is associated with only one passenger or with only a limited group of passengers without however, for example, dazzling passengers who are not associated with this illumination region or with this individual cabin illumination device. By way of the light-inlet aperture the light given off by the light source can enter the light-directing units and can leave through the light-outlet apertures, thus being available for illumination of a region which is associated with one passenger or with a group of passengers. In this arrangement, the light-directing units can be units that, for example, only let light pass that passes in a straight direction of propagation through both the light-inlet aperture and the light-outlet aperture, without the light beam, however, impinging on the wall. The component of light which while passing through the light-inlet aperture nevertheless impinges on a wall region can, for example, be absorbed at the wall region. However, the light-directing units can also be units that comprise a reflective wall, for example tubes comprising interior metallisation, or fibre optical waveguides based on total reflection, so that light entering through the light-inlet aperture can also be reflected on the wall, or also only on particular wall regions. The term "associated with a passenger" can also refer to association with a particular region in relation to a passenger, for example with a reading region. In this case, while the reading region is illuminated, the eyes of the passenger are not dazzled by the individual illumination.

According to an exemplary embodiment of the invention, the walls of the light-directing units form a lamella layer that comprises a multitude of lamellae, wherein the lamellae extend in a direction of extension essentially in the direction from the light source to the passengers associated with the light source.

By forming a lamella structure by means of the walls of the light-directing units, diffused light is prevented from propagating in the direction of the defused light region. In particular the light-directing units only give off the light that is provided for illumination of the predetermined illumination region. In this arrangement the height of the lamellae essentially determines the layer thickness of the flat-shaped antidazzle device. The layer thickness can, for example, be from 0.5 mm to 4 mm, but it is not limited to these thicknesses stated. The antidazzle region, i.e. the angle at which it is perceived that no light or only a greatly reduced quantity of light is given off, depends on the spacing of corresponding lamellae from each other in relation to the height of the lamellae. If the lamellae are arranged at smaller spacing from each other, then a lesser height of the lamellae is sufficient to achieve a particular antidazzle effect.

According to an exemplary embodiment of the invention, the lamellae are arranged in the form of a grid structure. A grid structure can, for example, be present in the form of grid apertures in the shape of squares, rectangles or triangles, without, however, being limited to these shapes. The average person skilled in the art will design a corresponding grid structure according to requirements.

A grid structure makes it possible to provide an antidazzle effect not only in one direction, for example towards the right or left, but instead also in further directions, for example towards the front and the rear in relation to the position of a seated passenger.

According to an exemplary embodiment of the invention, the lamellae are arranged in the form of a honeycomb structure.

A honeycomb structure provides a relatively good approximation to a circular form, at a minimum cover surface through the edges of the lamellae. This provides an antidazzle effect almost independently of the direction of view, for example right, left, rear, front, obliquely from the rear, obliquely from the front, etc. Furthermore, a honeycomb structure provides relatively good stability. The wall thickness of the lamellae is, for example, selected to be as thin as possible in order to reduce as much as possible the casting of shadows as a result of the thickness of the lamellae, which casting of shadows negatively effects light efficiency.

According to an exemplary embodiment of the invention, the lamellae are provided in the form of an essentially concentric arrangement.

In this arrangement the lamellae can, for example, be provided in the form of concentric circles, concentric ovals, concentric squares or concentric rectangles in order to ensure an antidazzle effect, for example, not only to the right and the left, but also to the front and the rear. In this arrangement, for example, the arrangement of a lamella in the form of a spiral is also considered an essentially concentric arrangement, although strictly speaking it is not a concentric arrangement but comprises a structure that essentially has a function that is identical to that of a concentric arrangement of lamellae. A spiral arrangement is advantageous in particular in the case of a production process in which the lamellae are wound on a central core.

According to an exemplary embodiment of the invention, the walls comprise a light-absorbent surface, at least in regions facing the associated passengers.

In this way it is possible to prevent a disagreeable reflection, in particular near the light-outlet aperture, which reflection would otherwise support the propagation of diffused light.

According to an exemplary embodiment of the invention, the walls comprise a light-reflecting surface, at least in regions facing away from the associated passengers.

In this way a situation can be achieved in which the components of light which enter the light-directing units through the light-inlet aperture are partly reflected so that said components of light are then available for non-dazzling illumination. In contrast to this, if the light impinges on the wall area at too steep angles of incidence, multiple reflection between the inlet aperture and the outlet aperture occurs, which reflection is, however, absorbed, for example by a light-absorbent surface, in regions facing the associated passengers, i.e. in regions situated near the light-outlet aperture.

According to an exemplary embodiment of the invention, the antidazzle device is curved.

In this way it is possible, for example, to design the spacing of the antidazzle device, for example, from a point-light source more evenly, which can increase the light efficiency and reduce the regions where shadows are cast within the antidazzle device.

According to an exemplary embodiment of the invention, the walls are inclined towards each other such that the majority of light rays that can be radially given off by an essentially point-shaped light source, by means of reflection on the walls, are given off so as to be essentially directed onto associated passengers.

In this way a situation can be achieved in which, for example, as a result of a lamella structure in the form of a honeycomb arrangement, grid arrangement or concentric arrangement, concentration of rays based on a reflection takes place in order to increase the light efficiency in this way. Such inclination of the walls relative to each other can, in particular, be achieved by a curvature in the antidazzle device. In each case the individual wall regions are inclined such that the part of the light impinging on them is reflected such that said part is situated in a region or sector intended for illumination.

According to an exemplary embodiment of the invention, the light-directing units are fibre optical waveguides.

By means of fibre optical waveguides the light can, for example, also be brought from regions of the light source, which regions are no longer facing the passenger, so that for example there is also no need to provide a reflector. Furthermore, the light source no longer needs to be situated vis-à-vis the illuminated regions, but instead can also be deflected by means of fibre optical waveguides. In this way it is possible, for example, to also separate the radiation heat of a light source from the direction in which light is given off.

According to an exemplary embodiment of the invention, the fibre optical waveguides are aligned such that a normal vector of a plane in which the light-inlet aperture is situated, starting from a region of the light-inlet aperture, essentially points towards the light source, and a normal vector of a plane in which the light-outlet aperture is situated, starting from a region of the light-outlet aperture, essentially points towards the associated passengers.

In other words, the light-inlet aperture is arranged such that the light given off by a light source orthogonally impinges on the aperture plane so that in particular in the case of fibre optical waveguides, which are based on the principle of total reflection in the interior, the highest possible component of light can be coupled in by way of the light-inlet aperture. By aligning the light-outlet aperture such that the outlet plane faces the passenger, it is furthermore also possible to provide the highest possible component of light for illumination.

According to an exemplary embodiment of the invention, the light source is a light-emitting diode matrix.

A light-emitting diode matrix, for example in the form of multiple light-emitting diodes or high-performance light-emitting diodes, for example comprising different colours for adjusting colour mixtures or colour temperatures, makes it possible to adapt the colour and colour temperature of the light to external factors. Furthermore, light-emitting diodes have a significantly longer service life than conventional light sources based on an incandescent filament. Moreover, the energy efficiency or light efficiency of a light-emitting diode matrix is significantly better than that of a conventional light source based on an incandescent filament. Of course, it is also possible to use monochrome light-emitting diodes or white light-emitting diodes.

According to an exemplary embodiment of the invention, the individual cabin illumination device is furthermore provided with a lens that is arranged between the light source and the antidazzle device, wherein the lens serves as a carrier device for the antidazzle device.

In this way the antidazzle device can be provided at the location where diffused light predominantly occurs, for example where the lens is not clean or at lens edges.

According to an exemplary embodiment of the invention, an aircraft with an individual cabin illumination device according to the invention is provided.

It should be noted that the embodiments of the invention described below equally relate to the individual cabin illumination device and to an aircraft comprising an individual cabin illumination device according to the invention.

The individual characteristics can of course also be combined, which in part can result in advantageous effects that exceed the sum of the individual effects.

These and other aspects of the present invention are explained and clarified with reference to the exemplary embodiments described below.

BRIEF DESCRIPTION OF THE DRAWINGS

Below, exemplary embodiments are described with reference to the following drawings.

DETAILED DESCRIPTION

Figure 1:
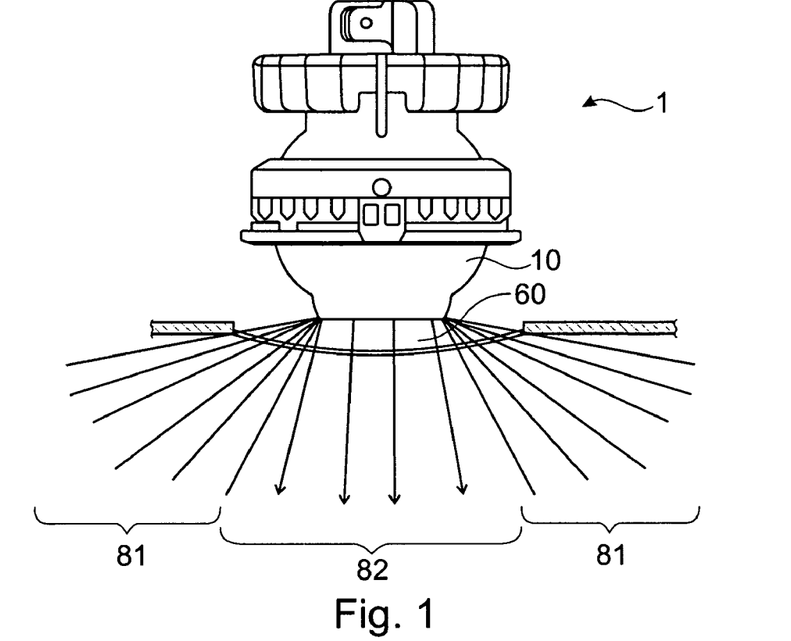
FIG. 1 shows an illumination element of an individual cabin illumination device without an antidazzle device.

FIG. 1 shows an illumination device of individual cabin illumination without an antidazzle device. In this arrangement the individual cabin illumination device 1 comprises a light source 10 which can, for example, be provided in a housing (not referenced). The light source can, for example, be a light source based on an incandescent filament or on the basis of a light-emitting diode arrangement. The illumination device can, for example, comprise a lens 60 in order to concentrate the light given off by the light source 10 such that light is given off in a directed manner. In particular in edge regions 81, light emission takes place by scattering or reflections at the edges, which scattering or reflections can, for example, disagreeably dazzle a person seated nearby. These components of light are not only perceived to be disagreeable by a person seated nearby, but they are also not available for targeted illumination. It is desirable that the light is only given off in a desired region 82, which corresponds, for example, to a reading region or a reading plane of a passenger who is associated with the corresponding light source or individual cabin illumination device. The region can, of course, also be associated with several passengers.

Figure 2:
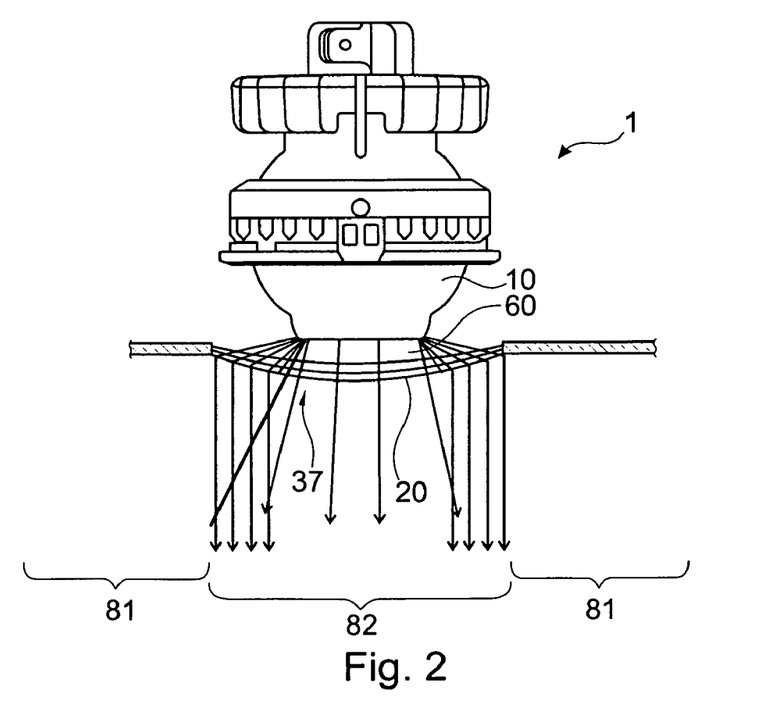
FIG. 2 shows an illumination element of an individual cabin illumination device with an antidazzle device.

FIG. 2 shows an exemplary embodiment of the invention in which, for example, the individual cabin illumination device not only comprises a light source 10 and a lens 60, but furthermore also an antidazzle device 20, which, for example suppresses the diffused light in the regions 81. According to an exemplary embodiment of the invention, the antidazzle device can not only suppress this diffused light, but it can also feed it to a desired illumination region 82 so that the total light efficiency of the individual cabin illumination device is improved. According to an exemplary embodiment of the invention, the antidazzle device 20 comprises a multitude of light-directing units that form a lamella layer 37. The design of such a lamella layer is explained in more detail with reference to FIGS. 3 to 8.

Figure 3:
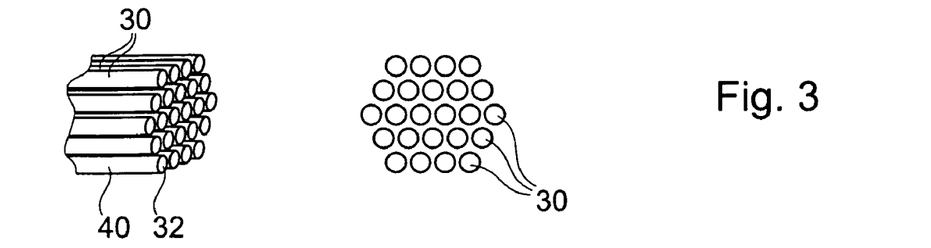
FIGS. 3 to 8 show exemplary embodiments of top views of the surface of an antidazzle device.

FIG. 3 shows a top view and a perspective view of the flat-shaped antidazzle device in which a multitude of light-directing units, for example in the form of fibre optical waveguides, are provided. The light-directing units 30 are arranged in the form of a matrix, wherein this matrix gives the antidazzle device a flat shape. It should be noted that a matrix does not necessarily have to be a regular arrangement, but instead can also be an arrangement of light-directing units that are irregularly arranged beside each other. In the case of the arrangement shown in FIG. 3, at least in the region of the light-outlet aperture, the fibre optical waveguides 40, which in this case represent the light-directing units 30, are aligned so as to be parallel to each other. The outlet apertures 32 of the fibre optical waveguides shown in this figure are essentially arranged in one plane, at least, however, in planes that are arranged parallel to each other. However, the light-outlet apertures can also be situated on a curved area, for example in order to obtain a desired widening of the radiation region.

Figure 4:
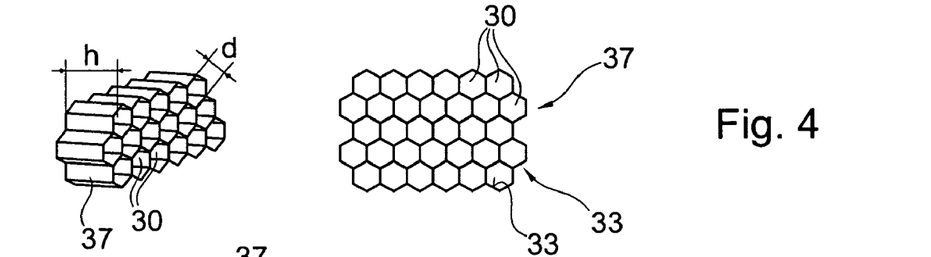

FIG. 4 shows an arrangement of light-directing units 30 with walls 33 that form a honeycomb-like lamella structure. The present illustration and FIG. 3 show both a flat view of the antidazzle device and a diagrammatic perspective view. FIGS. 4 and 3 only show a very small section of an exemplary antidazzle device. It should be noted that the dimension of the height h of the honeycomb cells can be relatively small, for example ranging from 0.5 to 4 mm so that a thin layer thickness of the antidazzle device is obtained. The diameter d of the respective honeycomb cells is approximately of the same magnitude dimension as the height of the honeycomb cells so that the corresponding illumination angle can be selected such that, for example, a person seated nearby is not dazzled. In all the embodiments shown in FIGS. 3 to 8 this illumination angle can be set by the selection of the lamella spacing and the lamella height.

Figure 5:
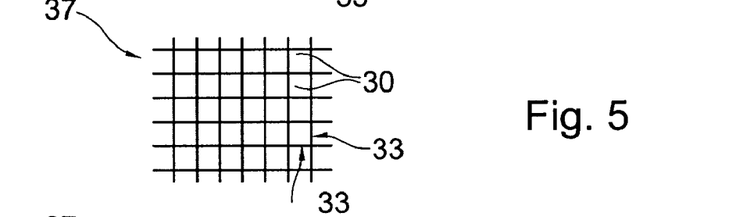

FIG. 5 shows an arrangement of the light-directing units 30 with walls 33 or with a lamella layer 37 affixed in the form of a grid. The details provided in the context of FIG. 4 essentially also apply to such a grid structure.

Figure 6:
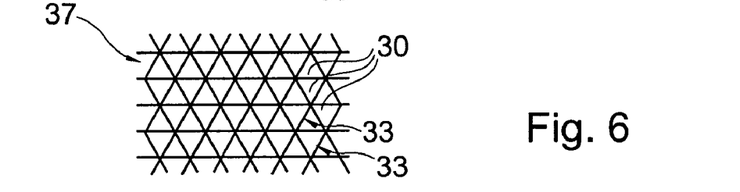

FIG. 6 shows a grid structure that is similar to that shown in FIG. 5, wherein the grid structure shown in FIG. 6 has a triangular cross-section. It should be noted that not only square or rectangular cross-sections, as shown in FIG. 5, or triangular cross-sections, as shown in FIG. 6, can be used for a grid structure, but also any other forms or shapes.

Figure 7:
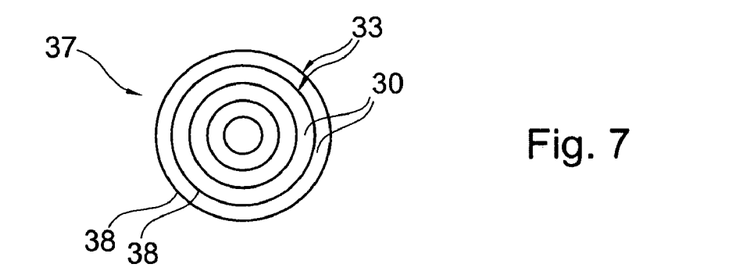

FIG. 7 shows a concentric arrangement of lamellae 38, wherein the spacing between the lamellae represents the individual light-directing units 30. In this arrangement the walls 33 form the lamellae 38 that form part of the lamella layer 37.

Figure 8:
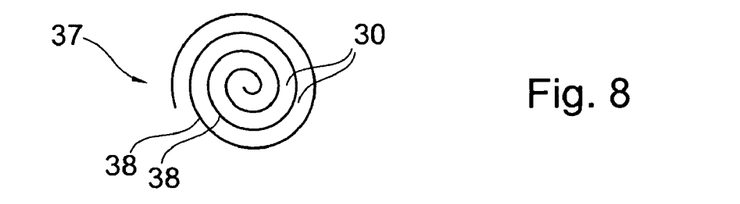

FIG. 8 shows a further exemplary embodiment of a lamella arrangement or a lamella layer 37 in which the lamellae are, however, not in the strict sense arranged concentrically but instead comprise a spiral structure, which can, in particular, be advantageous in various production methods. Essentially, the arrangement shown in FIG. 8 has a very similar effect to that of the arrangement shown in FIG. 7.

Figure 9:
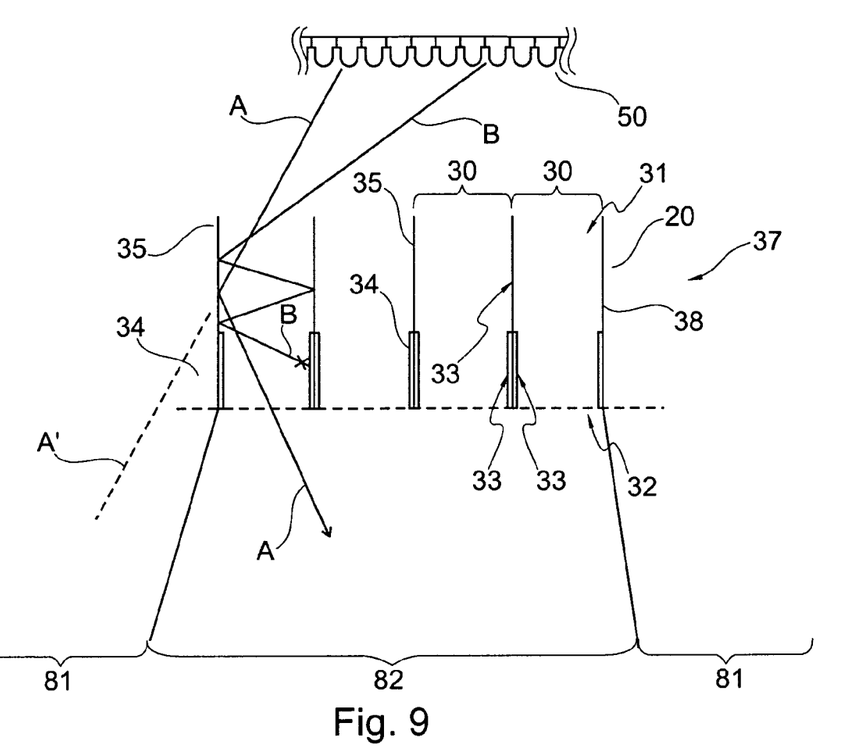
FIG. 9 shows exemplary beam paths through a light-directing unit according to an exemplary embodiment of the invention.

FIG. 9 shows an arrangement of the lamella layer 37 comprising a multitude of lamellae 38 that are formed by the light-directing units 30. In this arrangement each light-directing unit 30 comprises a light-inlet aperture 31 and a light-outlet aperture 32 which are interconnected by a wall 33. In the arrangement shown in FIG. 9, illumination takes place, for example, by means of a light-emitting diode matrix, which can, for example, comprise light-emitting diodes of one colour or of various colours so as to make it possible in this way to achieve a mixture of light and a setting of the colours or colour temperature. Of course, other light sources can also be selected, for example point-shaped or line-shaped light sources.

As an example, two beam paths A and B are shown, which can lead to different treatment within a light-directing arrangement 30, in particular when regions 34 of the walls 33 in the region of the light-outlet aperture 32 comprise a light-absorbent coating or surface. In this arrangement a region 35 of the wall 33, which region 35 is situated near the light-inlet aperture 31, can comprise a light-reflecting surface. In the case of the light in the beam path A, for example, the light in the region 35 near the light-inlet aperture 31 is reflected by the wall 33. Because of the comparatively flat angle of incidence onto the wall, a comparatively flat exit angle results, so that the light beam leaves the light-directing unit 30 through the light-outlet aperture, and no renewed reflection is generated within the light-directing unit 30. Such a light beam A, which without the antidazzle device would already be situated as light beam A' in the diffused light region 81, can in this way be returned to the illumination region 82 by a reflective surface 35, in the embodiment shown in the upper region of the light-directing unit 30.

In the case of a light beam B with a steeper angle of incidence there is, for example, also reflection in the upper region 35 of the light-directing unit 30. However, due to the steep angle of incidence, further reflection takes place, which, however, due to the steep angle of incidence and angle of reflection, ultimately ends in the light-absorbent region 34 of the wall 33. In this way it is possible to prevent a situation in which such light ultimately nevertheless leaves the antidazzle device 20 as diffused light.

Figure 10:
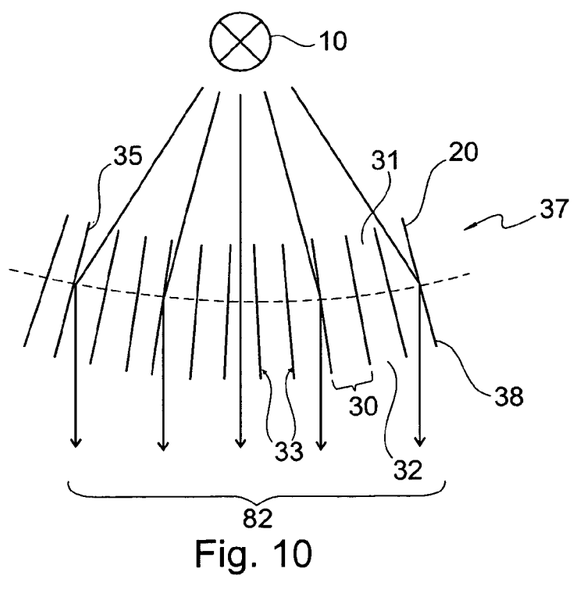
FIG. 10 shows an exemplary embodiment of an individual cabin illumination device.

FIG. 10 shows an exemplary embodiment of the invention, in which the lamellae 38 of the lamella layer 37 are inclined towards each other. The inclination of the lamellae 38 is, for example, arranged in such a manner that light which is, for example, given off radially in all directions by a point-shaped light source 10 impinges on the wall 33 of the lamellae 38 such that with corresponding reflection it leaves the light-outlet apertures 32 within the desired illumination region 82. By means of such an arrangement, concentration of light based on reflection on reflective areas 35 of the walls 33 can be achieved. In this arrangement it is possible, for example, to combine an inclined arrangement of the lamellae 38 or of the walls 33 relative to each other with a light-absorbent layer 34 as described in the context of FIG. 9. Furthermore, the inclined arrangement of the lamellae 38 or the walls 33 can be achieved both in the case of a curved antidazzle device 20 and in the case of a planar antidazzle device 20. By means of the curving process the inclination of the lamellae 38 and the walls 33 relative to each other can be achieved at the same time in a single process step as part of the curving process.

Of course, downstream of a point-shaped light source it is also possible to provide a reflector which not only improves light efficiency, but also supports focusing of the light.

Figure 11:
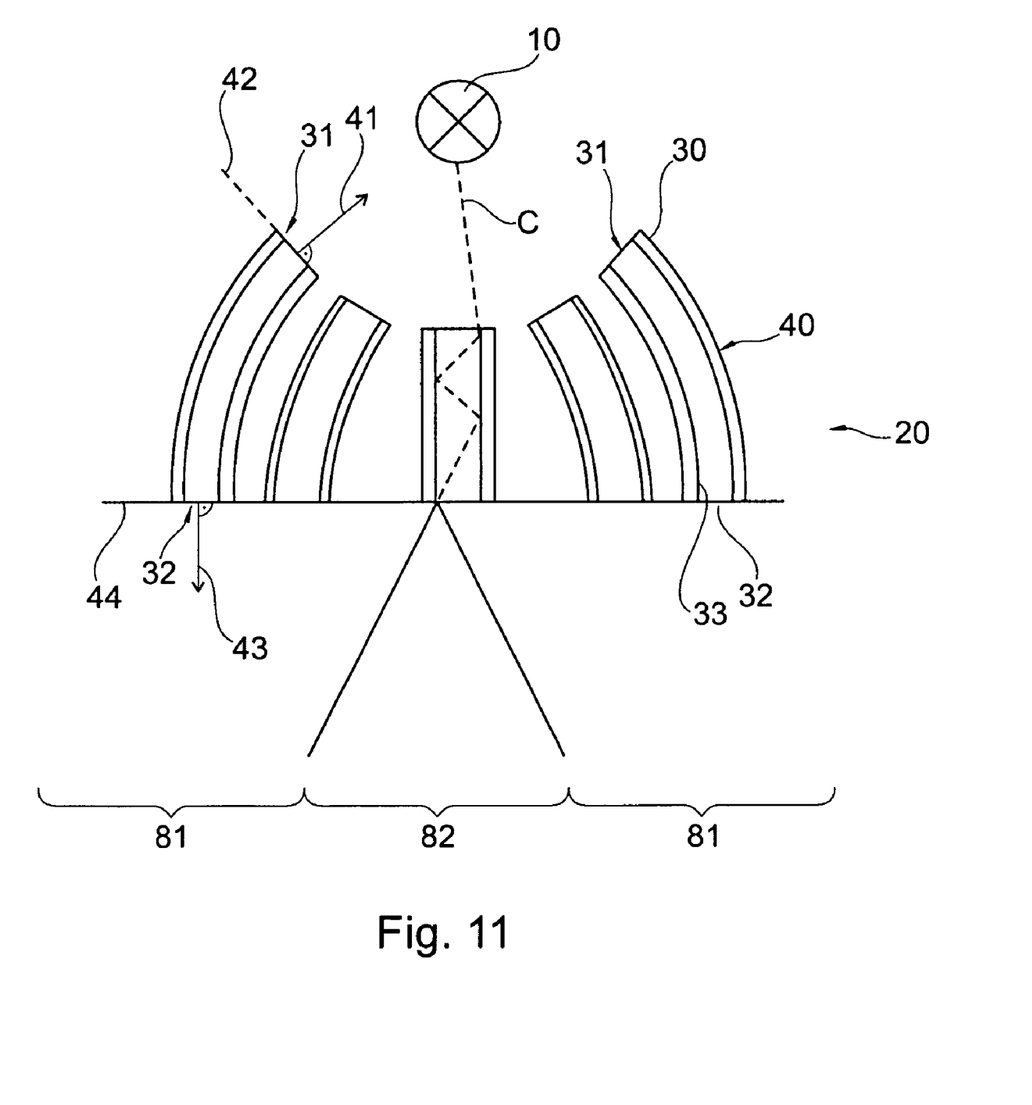
FIG. 11 shows a further exemplary embodiment of an individual cabin illumination device.

FIG. 11 shows an exemplary embodiment of the invention, in which the individual cabin illumination device comprises a multitude of light-directing units 30 in the form of fibre optical waveguides 40. In this arrangement it is not mandatory for the fibre optical waveguides 40 to be arranged so as to be spaced apart from each other; instead they can also rest against each other. Any spaces can, for example, be filled with adhesives or resins in order to ensure dimensional accuracy of the arrangement. A fibre optical waveguide also comprises a light-inlet aperture 31 and a light-outlet aperture 32 that are connected by a wall 33. As a rule, a casing is also provided, which in the case of a fibre optical waveguide as a rule has a lower refractive index than does the core of the fibre optical waveguide 40. In this way the light can be guided according to the principle of total reflection within the fibre optical waveguide 40. Based on this, a limited angle of radiation results at the light-outlet aperture 32, which limited angle of radiation is due to the total reflection conditions. As shown in FIG. 11, in this arrangement the fibre optical waveguides 40 can be aligned such that the normal vector 41 of a plane 42 in which the light-inlet aperture 31 is situated is aligned such that starting from a region of the light-inlet aperture 31 it points to the light source 10. Furthermore, the light-outlet aperture 32 can be arranged such that a normal vector 43 of a plane 44 in which the light-outlet aperture 32 is situated essentially points in the direction of a passenger or of the reading region of the passenger with whom the illumination region is associated. In other words, the light-inlet aperture 31 is situated so as to directly face the light source 10, while the light-outlet aperture 32 points in the direction of the object to be illuminated or of the passenger who is associated with the illumination region. With an arrangement as shown in FIG. 11 it is in principle also possible, for example, to feed light from the rear of the light source 10 to the plane 44 in order to in this way, for example, render a reflector superfluous.

In the above arrangement the maximum angle of radiation given by total reflection essentially corresponds to the desired illumination region 82, while components of light that exceed this angle of radiation are already absorbed within the fibre optical waveguide 40. An arrangement of the light-outlet aperture on a curved area can widen the illumination sector if desired.

The beam path C, which in the diagram is shown with the middle fibre optical waveguide, results in a limited radiation region 82 that applies correspondingly in the case of the other fibre optical waveguides. In the diagram the refraction during entry of the light into the core region of the fibre optical waveguide by way of the light-inlet aperture, and during exit from the core region by way of the light-outlet aperture has not been taken into account in the drawing.

Figure 12:
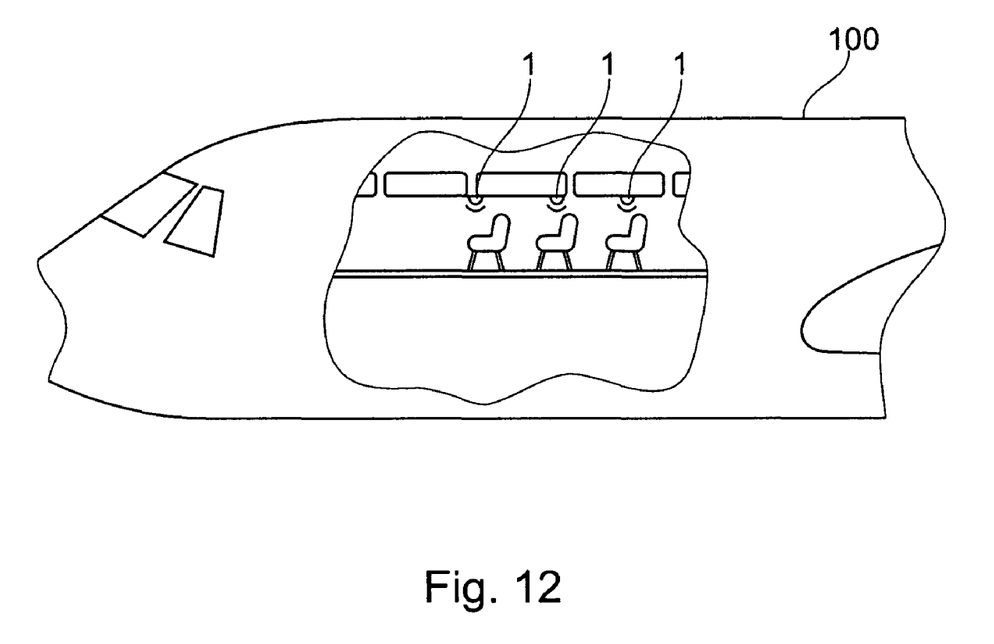
FIG. 12 shows an aircraft with an individual cabin illumination device according to the invention.

FIG. 12 shows an aircraft 100 with a number of individual cabin illumination devices 1 according to the invention. An individual cabin illumination device can be arranged overhead, for example underneath a hatrack, or it can, for example, be arranged in the form of lamps that are integrated in the rear part of the seat in front. Of course, such a lamp can also provide improved variability, for example if it comprises an articulated arm so that a passenger can individually alter the illumination region.

It should be noted that the present invention can not only be used in aircraft, but also, for example, in buses or other motor vehicles and generally wherever non-dazzling individual illumination is required.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. An individual cabin illumination device in an aircraft, comprising:
    a light source associated with a passenger or with a group of passengers;
    an antidazzle device, the antidazzle device comprising a multitude of light-directing units, each light-directing unit comprising a light-inlet aperture, a light-outlet aperture, and a wall that connects the light-inlet aperture to the light-outlet aperture, wherein the walls are inclined towards each other such that the majority of light rays that can be radially given off by an essentially point-light source, by means of reflection on the walls, are given off so as to be essentially directed onto associated passengers, the light-directing units allowing diffusion of the light that can be given off by the light source essentially only onto the passengers associated with the light source.

2. The individual cabin illumination device of claim 1, wherein the multitude of light-directing units are arranged one beside the other in a matrix, and the matrix provides the antidazzle device with a flat shape.

3. The individual cabin illumination device of claim 1, wherein the walls of the light-directing units form a lamella layer that comprises a multitude of lamellae, wherein the lamellae extend in a direction of extension essentially in the direction from the light source to the passengers associated with the light source.

4. The individual cabin illumination device of claim 3, wherein the lamellae are arranged in the form of a grid structure.

5. The individual cabin illumination device of claim 3, wherein the lamellae are arranged in the form of a honeycomb structure.

6. The individual cabin illumination device of claim 3, wherein the lamellae are arranged in the form of an essentially concentric arrangement.

7. The individual cabin illumination device of claim 1, wherein the walls comprise a light-absorbent surface, at least in regions facing the associated passengers.

8. The individual cabin illumination device of claim 1, wherein the walls comprise a light-reflecting surface, at least in regions facing away the associated passengers.

9. The individual cabin illumination device of claim 1, wherein the antidazzle device is curved.

10. The individual cabin illumination device of claim 1, wherein the light-directing units are fibre optical waveguides.

11. The individual cabin illumination device of claim 10, wherein the fibre optical waveguides are aligned such that a normal vector of a plane in which the light-inlet aperture is situated, starting from a region of the light-inlet aperture, essentially points towards the light source, and a normal vector of a plane in which the light-outlet aperture is situated, starting from a region of the light-outlet aperture, essentially points towards the associated passengers.

12. The individual cabin illumination device of claim 1, wherein the light source is a light-emitting diode matrix.

13. The individual cabin illumination device of claim 1, further comprising a lens that is arranged between the light source and the antidazzle device, wherein the lens serves as a carrier device for the antidazzle device.

14. An aircraft comprising an individual cabin illumination device of claim 1.

* * * * *